United States Patent Office 3,194,820
Patented July 13, 1965

3,194,820
PREPARATION OF DIAMINO-1,1'-DIANTHRA-
QUINONYL
Maurice Grelat, Basel, Switzerland, assignor to Ciba
Limited, Basel Switzerland, a Swiss firm
No Drawing. Original application Oct. 26, 1959, Ser.
No. 848,516. Divided and this application Dec. 28,
1961, Ser. No. 166,978
Claims priority, application Switzerland, Sept. 23, 1959,
78,552/59
6 Claims. (Cl. 260—367)

The present application is a division of copending application Serial No. 848,516, filed October 26, 1959, now abandoned.

Organic pigment dyestuffs, which are to be used for coloring organic products, for example, lacquers, plastics, for example, polyvinyl chloride, printing colors or artificial silk, must fulfill a very wide variety of requirements. The most important requirements are a high degree of insolubility in organic solvents, very good fastness to light even in weak colorings, good fastness to migration and also heat resistance.

While there are among blue and green dyestuffs in the phthalocyanine and chlorinated phthalocyanine series and in the indanthrone series pigments that fulfill the foregoing requirements reasonably well, there have not hitherto been found among dyestuffs of other tints, especially among vat dyestuffs, any pigments that fulfill all the aforesaid requirements.

It has been found that 4:4'-diamino-1:1'-dianthraquinonyl of the formula

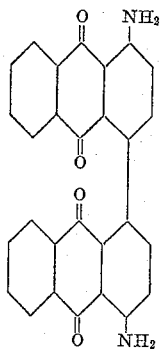

fulfills the aforesaid requirements to a high degree and is excellently suited for coloring organic products.

Colorations produced with the aforesaid dyestuff in organic products, for example, lacquers, plastics especially polyvinyl chloride, printing colors or artificial fibers, such as viscose artificial silk or cellulose acetate artificial silk fibers, are distinguished by their very good fastness to light even in weak colorations, and their excellent fastness to migration.

When the pigment to be used in the process of this invention is not already in a finely divided form and/or in the modification that is especially suitable for its use, it is desrable that the pigment should be subjected before use to a conditioning treatment, for example, by reprecipitation of the dyestuff from concentrated sulfuric acid, or grinding in the dry or wet condition, advantageously in the presence of an organic water-soluble or water-insoluble solvent, or by kneading or grinding the crude pigment in the presence of a solid assistant, for example, a salt capable of being removed by washing. Conditioning can also be brought about by heating the crude pigment in water at a temperature above 100° C. and under pressure. Good results can also be obtained by combining various treatments, for example, swelling the crude pigment in sulfuric acid and then treating it with an organic solvent.

In many cases it is of advantage, in order to convert the pigment into a finely divided form, to grind the crude pigment with the substratum to be colored or with a component of the substratum. The transference of the pigment from the aqueous medium into an organic substratum can also be carried out by the so-called "Flush" process.

The pigment may be used either alone or in the form of a pigment preparation in which the pigment is present embedded within a carrier in the desired state of uniform and fine dispersion. As carriers there may be used a very wide variety of organic or inorganic compounds, for example, aluminum hydroxide, natural or synthetic resins, for example, dihydroabietic acid and salts or esters thereof, polyamides or aminoplasts, or plasticizers, for example, dioctyl phthalate.

The 4:4'-diaminodianthraquinonyl may also be used in the form of a pigment preparation in which the pigment is present in a state of fine subdivision, advantageously having an average particle diameter not exceeding 3 microns. The preparation may contain the other usual additions, for example, dispersing agents or binding agents.

The known processes for making diamino-1:1'-di-anthraquinonyls, for example, by nitrating di-anthraquinonyls and reducing the dinitro-compounds so obtained, give poor yields. The present invention provides a new process for the manufacture of diamino-1:1'-dianthraquinonyls, wherein two molecular proportions of a 1-acylamino-anthraquinone, which contains in a further α-position a halogen atom, for example, a bromine atom or especially a chlorine atom, are heated with copper and the acyl groups in the resulting diacylamino-1:1'-dianthraquinonyl so obtained are split off.

As starting materials there may be used, for example, those acylamino-halogen-anthraquinones in which the acyl radical is the radical of an aliphatic carboxylic acid, for example, acetic acid, but there are preferably used aroylamino-halogen-anthraquinones, especially benzoylamino-halogen anthraquinones. As examples there may be mentioned 1-chloro-4-benzoylamino-anthraquinone, 1 - chloro - 4 - acetylamino - anthraquinone, 1 - chloro - 5 - benzoylamino - anthraquinone, 1-chloro-8-benzoylamino-anthraquinone and 1:6:7 - trichloro - 4 - benzoylamino-anthraquinone.

The condensation is advantageously carried out in an inert high boiling organic solvent, for example, trichlorobenzene, nitrobenzene, naphthalene and especially dimethyl-formamide, at a raised temperature advantageously within the range of 150° C. to 250° C.

The copper is advantageously used in pulverulent form, and at least one atomic proportion of copper is required for every two molecular proportions of acylamino-halogen-anthraquinone. It is of advantage to use an excess of copper, for example, at least three atomic proportions of copper for each molecular proportion of acylamino-halogen-anthraquinone.

The diacylamino-dianthraquinonyls so obtained precipitate from the reaction mixture owing to their sparing solubility and can be isolated by filtration. It has been found advantageous to remove the copper and copper halide present in the crude product. This is advantageously carried out by heating the crude product in an aqueous solution of an alkali metal chlorate in the presence of hydrochloric acid. The diacylaminoanthraquinones so obtained are in some cases yellow vat dyestuffs which dye cellulose fibers yellow tints.

The splitting off of the acyl groups may be carried out under acid or alkaline conditions.

In the case of dibenzoylamino-dianthraquinonyls it is of advantage to treat them with concentrated sulfuric acid at a raised temperature, preferably within the range of 80° C. to 150° C.

The diamino-dianthraquinonyls so obtained do not in general possess the character of vat dyestuffs. On the other hand, they are valuable pigments or dyestuffs intermediates.

The following examples illustrate the invention, the parts and percentages being by weight unless otherwise stated:

*Example 1*

5 parts of 4:4'-diamino-1:1'-dianthraquinonyl are mixed with 95 parts of dioctylphthalate, and the mixture is ground in a ball mill until the dyestuff particles are smaller than 3 microns.

0.8 part of the resulting dioctyl phthalate paste is mixed with 30 parts of polyvinyl chloride, 7 parts of dioctyl phthalate, 0.1 part of cadmium stearate and 1 part of titanium dioxide, and the mixture is then rolled for 5 minutes on a two-roller mill at 140° C. There is obtained a brilliant red coloration of very good fastness to light and migration.

In order to test the fastness to migration a colored foil prepared from the colored polyvinyl chloride was covered with a white foil, and the two foils were heated at 80° C. under a pressure of 1000 grams per square centimeter for 24 hours.

*Example 2*

40 parts of a nitrocellulose lacquer, 2.375 parts of titanium dioxide and 0.125 part of 4:4'-diamino-1:1'-dianthraquinonyl are ground together in a rod mill for 16 hours. The lacquer so obtained is brushed in a thin layer on an aluminum foil. There is obtained a red lacquer coating having very good properties of fastness.

*Example 3*

A mixture of 25 parts of 4:4'-diamino-1:1'-dianthraquinonyl, 25 parts of acetyl-cellulose (54.5% of combined acetic acid), 100 parts of sodium chloride and 50 parts of diacetone-alcohol is treated in a kneading machine, while cooling, until the pigment has reached the desired degree of fineness. There are then added 25 parts of water and kneading is continued until a finely granular mass is obtained. The mass is placed on a suction filter and the sodium chloride and diacetone-alcohol are completely removed by washing with water. The residue is dried in a vacuum cabinet at 85° C. and ground in a hammer mill.

To a cellulose acetate silk spinning composition consisting of 100 parts of acetyl-cellulose and 376 parts of acetone are added 1.33 parts of the pigment preparation obtained as described above. The whole is stirred for 3 hours, which suffices to bring about complete dispersion of the dyestuff. Filaments produced from the resulting mass in the usual manner by the dry spinning process have a red coloration which has very good properties of fastness.

*Example 4*

0.25 part of 4:4'-diamino-1:1'-dianthraquinonyl is ground in a rod mill for 24 hours with 40 parts of an alkyd-melamine bakeable lacquer having a solids content of 50%, and 4.75 parts of titanium dioxide. The lacquer so obtained is brushed with a thin layer on an aluminum foil and the coating is baked for one hour at 120° C. There is obtained a red lacquer coating having an excellent fastness to light.

*Example 5*

4.8 parts of 4:4'-diamino-1:1'-dianthraquinonyl are ground in a ball mill with 4.8 parts of the sodium salt of 1:1'-dinaphthylmethane-2:2'-disulfonic acid and 22.1 parts of water until all the dyestuff particles are smaller than one micron. The pigment suspension so obtained has a pigment content of about 15%.

By adding the aqueous suspension to a viscose spinning composition there are obtained by the usual spinning process red colored cellulose filaments having very good properties of fastness.

*Example 6*

A dyebath is prepared which contains in 1000 parts of water,
15 parts of a latex of a copolymer of 85.8 parts of isobutylacrylate, 9.6 parts of acrylonitrile and 4.6 parts of acrylic acid,
15 parts of an emulsion of 70% strength of a methylolmelamine allyl ether modified with soya bean fatty acid and emulsified with Turkey red oil,
50 parts of a water-soluble methyl ether of a ureaformaldehyde condensation product in which more than 2 mols of formaldehyde have been condensed per mol of urea,
5 parts of the pigment suspension obtained as described in the first paragraph of Example 5, and
20 parts of formic acid of 10% strength.

A cotton fabric is immersed at room temperature in the dry state in the above dyebath, the fabric is then squeezed on a foulard to a wet increase of 65–80%, dried in the normal manner, if desired under tension (by means of clamps or on a needle frame) and then subjected to hardening treatment for 5 minutes at 145–150° C.

There is obtained a red coloration which is distinguished by excellent properties of fastness, especially its fastness to light.

*Example 7*

24 parts of 4:4'-diamino-1:1'-dianthraquinonyl are kneaded in a kneading machine with 10 parts of a condensation product of 1 mol of 2:6-ditertiary butyl-paracresol and 15 mols of ethylene oxide, 31 parts of water are added, and the dyestuff paste is homogenized on a roller mill.

There is added, while stirring cautiously, a resin lacquer emulsion, consisting of 7 parts of water and 28 parts of a preparation obtained in the manner described below. There are obtained 100 parts of a mobile dyestuff paste which is well dispersed and is very suitable in combination with an aqueous binding agent for use in textile printing.

The preparation mentioned above may be prepared as follows:

800 parts of a solution of about 70% strength of a butanol-modified melamine-formaldehyde condensate in butanol are emulsified in an aqueous solution containing 620.4 parts of water, 80 parts of purified lactalbumen-free acid casein, 64 parts of urea, 16 parts of thiourea, and 9.6 parts of borax. To the moderately thickly liquid finely dispersed emulsion are added 10 parts of an aqueous solution of ammonia of about 25% strength in order to convert into hexamethylene-tetramine the 0.82% of free formaldehyde present in the resin solution, which passes into the aqueous phase during the emulsification. After diluting the emulsion with a further 377 parts of water it is subjected to distillation under reduced pressure in an apparatus working on the circulation principle, whereby about 500 parts of water and about 170 parts of butanol are distilled off. There are obtained about 1310 parts of a stable salve-like preparation which, after dilution with an equal quantity of water, has a pH value of 7.7. 1000 parts of the diluted emulsion, after being mixed with 100 parts of an aqueous solution of ammonium thiocyanate of 50% strength, yield a binding agent composition which can be excellently hardened at a raised temperature.

By the distillation the solvent content of the resin phase is reduced from about 30% to about 10%, and at the same time the total dry content of the emulsion is raised from about 45% to about 55%.

*Example 8*

For making a laminated material the following individual sheets are prepared:

(a) Strong paper of unbleached sulfate cellulose (so-called kraft paper) is impregnated with an aqueous solution of phenol-formaldehyde resin, and then pressed and dried.

(b) Paper of pure chemically bleached cellulose containing zinc sulfide or titanium dioxide as filling material is impregnated with an aqueous solution of 50% strength of dimethylol-melamine, and is then pressed and dried at 100° C.

(c) 400 parts of a decoration paper of bleached cellulose containing zinc sulfide or titanium dioxide as filling material are disintegrated in a hollander with 10,000 parts of water. To the paper mass so obtained are added 30 parts of the pigment suspension obtained as described in Example 5. The pigment is fixed by the addition of 16 parts of aluminum sulfate. The colored decoration paper is impregnated with an aqueous solution of 50% strength of dimethylol-melamine, and is then pressed and dried at 100° C.

(d) Depending on the quality of the laminated material the decoration paper is protected with a silk paper of bleached special cellulose, which weighs 40 grams per square meter. The silk paper is also impregnated with an aqueous solution of 50% strength of dimethylol-melamine, and then pressed and dried at 100° C.

Pieces of the sheets so prepared having the same size, for example, 2.75 meters by 1.25 meters, are placed one upon another as follows: Upon 3 to 5 sheets of paper (a) are laid one sheet of paper (b), one sheet of paper (c) and, if desired, one sheet of paper (d), and the whole assembly is pressed between highly polished chromium plated plates for 12 minutes at 140–150° C. under a pressure of 100 kilograms per square centimeter. The assembly is then cooled to 30° C. and the resulting laminated material is removed from the press. The material has on one side a red coloration which has an excellent fastness to light.

*Example 9*

99 parts of a polyamide of ω-aminoundecanoic acid are "bread-crumbed" in the form of chippings with 1 part of very finely divided 4:4'-diamino-1:1'-di-anthraquinonyl. The "bread-crumbed" chippings are spun in the usual manner, for example, by the grid spinning method, at 240° C. There are obtained red colored polyamide filaments having good properties of fastness.

*Example 10*

60 parts of 1-chloro-4-benzoylaminoanthraquinone, 28 parts of copper powder and 600 parts by volume of dimethyl-formamide are stirred for 15 hours at 150–155° C. (the boiling temperature). At 50° C. the residue is filtered off with suction, and washed with about 200 parts by volume of dimethyl-formamide and then with water. The filter residue is suspended in 1500 parts by volume of hydrochloric acid of 10% strength and the whole is heated to 70–80° C. While stirring, there are added 350 parts by volume of sodium chlorate solution of 20% strength and the whole is stirred at 80° C. for 1½ hours. The excess of copper is then dissolved. The mixture is filtered with suction, and the filter residue is washed with water until the washings are neutral, and dried. The yield amounts to 49 parts which represents 91% of the theoretical yield.

49 parts of 4:4'-dibenzoylamino-1:1'-dianthraquinonyl are dissolved in 450 parts of sulfuric acid of 96% strength. The solution is heated to 110° C. and then stirred at that temperature for one hour. The whole is diluted with water until the concentration of the acid is 30% (the temperature has to be raised to 130° C.) and the precipitated 4:4'-diamino-dianthraquinonyl is filtered off with suction. It is washed first with water, then with ammonia solution, and washed with water until the washings are neutral. The crude 4:4'-diamino-dianthraquinonyl is dried, then finely pulverized and treated with 400 parts by volume of nitrobenzene for one hour at 170–180° C. The mixture is filtered with suction while hot, the filter residue is washed with some nitrobenzene, then with alcohol and dried. The yield amounts to 25.5 parts which represents 76% of the theoretical yield.

By using as starting material in this example 1-chloro-5-benzoylaminoanthraquinone, there is obtained in good yield 5:5'-diamino-1:1'-dianthraquinonyl, which can only be obtained in very poor yields when prepared by the known methods.

By using as starting material 1-chloro-8-benzoylaminoanthraquinone, there is obtained in the first stage 8:8'-dibenzoylamino-1:1'-dianthraquinonyl, which dyes cellulose fibers from a vat yellow tints. After splitting off the benzoyl groups in the manner described in the example there is obtained 8:8'-diamino-1:1'-dianthraquinonyl, which cannot be obtained by the known methods and is therefore not described in the literature. It is a yellowish red compound.

In a similar manner 3:3'-diamino-1:1'-dianthraquinonyl, which is a brown-orange compound, can be obtained.

*Example 11*

59.9 parts of 1-chloro-4-acetylaminoanthraquinone, 34 parts of copper powder and 570 parts of dimethylformamide are maintained at the boil for 15 hours, while stirring. After lowering the temperature to 50° C. the precipitate is filtered off, washed with dimethyl-formamide and water, and suspended in 1900 parts of hydrochloric acid, of 10% strength. To the suspension are added dropwise at 70–80° C. in the course of one hour 485 parts of sodium chlorate solution of 20% strength, the whole is stirred at the same temperature for a further ½ hour, and the yellow crystals are filtered off. After washing and drying the product there are obtained 38 parts of 4:4'-diacetylamino-1:1'-dianthraquinonyl.

A solution of 52.8 parts of 4:4'-diacetylamino-1:1'-dianthraquinonyl is stirred in 528 parts of sulfuric acid of 96% strength for one hour at 110° C., and 116 parts of water are then slowly added. The precipitated red product is filtered off, and washed with water and dried. For purification the crude product is stirred with 535 parts of nitrobenzene for one hour at 170–180° C. After filtering off the product and washing it with nitrobenzene, there are obtained 34.5 parts of 4:4'-diamino-1:1'-dianthraquinonyl.

What is claimed is:

1. A process for the manufacture of diamino-1:1'-dianthraquinonyls, wherein two molecular proportions of a 1-acylamino-α-chloroanthraquinone whose acyl radical is derived from a member selected from the group consisting of a lower alkanoic acid and benozic acid is heated with at least one atomic proportion of copper in an inert high boiling solvent and the acyl groups are split off from the resulting diacylamino-1:1'-dianthraquinonyl.

2. A process as claimed in claim 1, wherein a 1-benzoylamino-α-chloranthraquinone is used as starting material.

3. A process as claimed in claim 1, wherein a 1-acetylamino-α-chloranthraquinone is used as starting material.

4. A process as claimed in claim 1, wherein the copper is used in pulverulent form.

5. A process as claimed in claim 1, wherein the condensation is carried out in dimethyl-formamide.

6. A process as claimed in claim 1, wherein the condensation is carried out at a temperature within the range of 150–250° C.

References Cited by the Examiner

UNITED STATES PATENTS 1,616,109  2/27  Bunbury _____ 260—367
2,002,247  5/35  Moser et al. _____ 260—367

FOREIGN PATENTS 952,121  11/56  Germany.

OTHER REFERENCES

Fierz-David, H. E., Kunstliche Organische Farbstoffe, publ. by J. Springer, 1926, page 578.

Mosby et al., "J. Org. Chem." vol. 25 (1960), pp. 455–457.

LORRAINE A. WEINBERGER, *Primary Examiner.*

CHARLES B. PARKER, LEON ZITVER, *Examiners.*